Aug. 7, 1923.

W. J. KOESTER ET AL

MOTOR VEHICLE BUMPER

Filed July 5, 1921

1,464,321

INVENTORS
William J. Koester
James D. Foster
BY Clarence Perdew
ATTORNEY

Patented Aug. 7, 1923.

1,464,321

UNITED STATES PATENT OFFICE.

WILLIAM J. KOESTER AND JAMES D. FOSTER, OF CINCINNATI, OHIO.

MOTOR-VEHICLE BUMPER.

Application filed July 5, 1921. Serial No. 482,340.

*To all whom it may concern:*

Be it known that we, WILLIAM J. KOESTER and JAMES D. FOSTER, citizens of the United States, residing at Cincinnati, in the county of Hamilton and State of Ohio, have invented certain new and useful Improvements in Motor-Vehicle Bumpers, of which the following is a specification.

Our invention relates to fenders or bumpers for receiving impacts on vehicles. Its object is to simplify and increase the efficiency and durability of such devices. Other objects will appear in the course of the ensuing description.

We attain these objects by the device illustrated, for example, in the accompanying drawing, in which—

Figure 1:
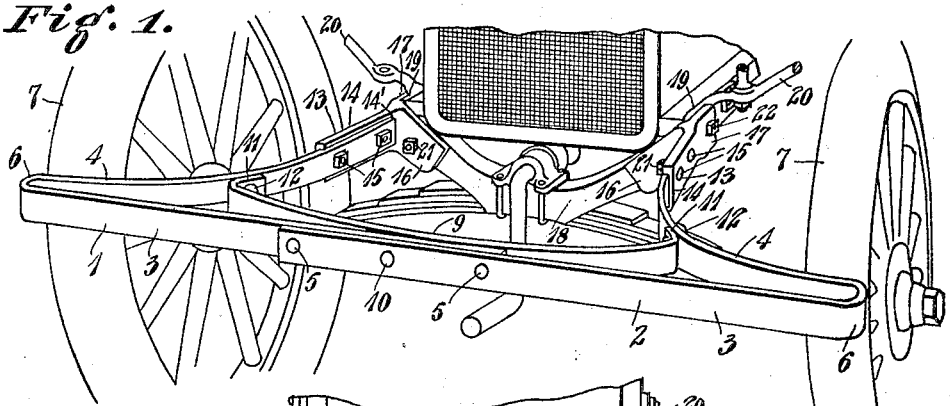
Figure 1 is a perspective view of the front part of a motor vehicle of well known construction, with our invention applied thereto.
Figure 2:
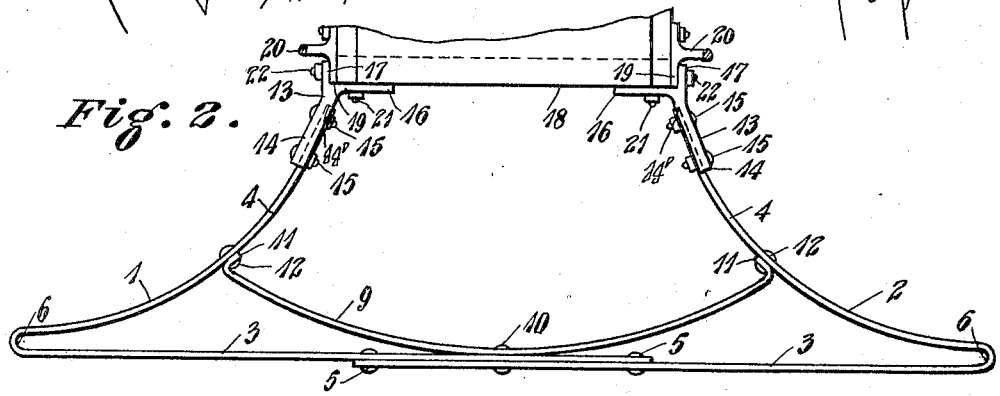
Fig. 2 is a plan view of the bumper of Fig. 1, and part of the vehicle to which it is attached.
Figure 3:
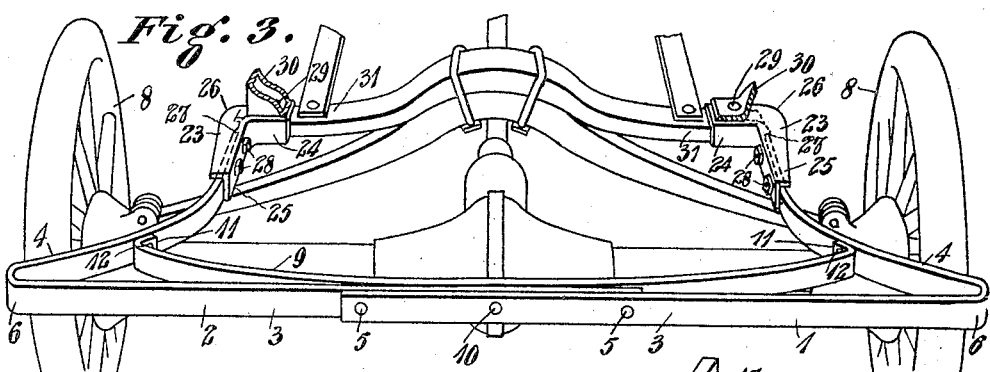
Fig. 3 is a perspective view of the rear part of a motor-vehicle of the kind shown in Fig. 1, with our invention applied thereto.
Figure 5:
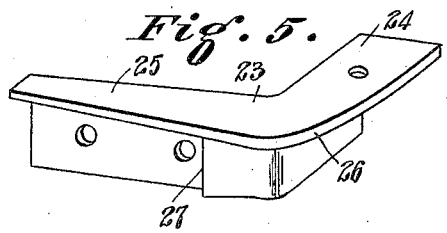
Fig. 5 is a similar view of the bracket of the rear bumper of Fig. 3, for the right-hand side of the vehicle.
Figure 4:
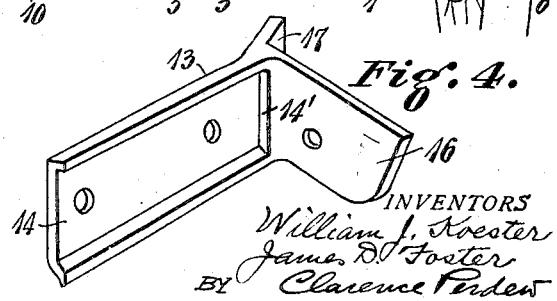
Fig. 4 is a detail perspective view of the bracket of the front bumper of Fig. 1, for the right-hand side of the vehicle.

In the front bumper, of Figs. 1, 2 and 4, as well as in the rear bumper of Figs. 3 and 5, the advanced portion, or portion of the structure farthest from the vehicle when mounted thereon, is composed of right and left sections 1 and 2, each made up of a flat bar bent upon itself to have an outer or advanced member 3 and a member 4 to extend inward toward the vehicle. The outer members 3 are straight and lapped at the middle of the structure for a distance preferably a little less than half the length of each member 3, and are secured together by rivets 5 near the ends of the respective overlapping parts, passing horizontally through the parts, which have their greatest dimensions, or widths, vertical.

The members 4, joining the laterally outward ends of the members 3 integrally, in curves 6 of ample radius to permit movement of the members 3 and 4 relatively to each other and to avoid crystallization and breakage of the material by such movement, curve away from the members 3 along arcs of relatively great radius; so that each inwardly extending member 4 is an arch, bowed diagonally toward the transverse members 3. The members 4 thus extend toward the vehicle, joining the relatively narrow chassis structure of the vehicle and diverging therefrom to the transverse means made up of the members 3, with the hollows of their arched formation leaving ample space for the swinging of the front wheels 7, in the front bumper, and to clear the rear wheels 8, in the rear bumper.

The transverse arch-bar 9 is attached at its middle to the lapped parts of the transverse members 3 by a rivet 10 passing horizontally through the members 3 and the bar 9, which bar bears against the inner exposed side of the inner lapping part; this bar 9 being flat similar to the sections 1 and 2, with its greatest dimension, or width, vertical. Preferably, it is of the same width as the bars of the sections 1 and 2, with its upper and lower edges flush with the upper and lower edges of these sections. It curves toward the vehicle from this middle attaching rivet 10, extending laterally and meeting the arched side members 4, near the middles of the respective members 4, with end parts bent to form short flanges 11 lying flat against the adjacent sides of the members 4 with upper and lower edges flush with the upper and lower edges of these members. Rivets 12 pass horizontally through these flanges 11 and through the members 4, fixing the ends of the arch-bar 9 to these members 4.

The attaching means for the front bumper (Figs. 1, 2 and 4) preferably are brackets 13, each comprising a straight channel or main part 14 to lie along the outer side of the rear end part of a respective member 4, with this part in its channel and the flanges of the channel lying along the upper end lower edges of the member 4, and the end of the member 4 abutting the rear end 14' of the channel, which thus forms a shoulder for this abutment. Bolts 15 pass horizontally through the member 4 and the upright web of the channel 14, fixing the respective end part to the bracket 13.

At the rear end of this main part or channel 14 of each bracket 13 are the legs 16 and 17, integral with the part 14. One of these legs 16, inclines downward and inward transversely of the vehicle, but with its greatest dimension, or width, upright; and the other leg, 17, extends beyond or rearwardly from the junction of the leg 16 with the channel 14, with its greatest dimension, or width, upright. The adjacent flat sides of the legs 16 and 17 are substantially at right angles to each other; and are adapted to fit snugly against front and lateral sides, respectively, of the right or left corner part of the vehicle chassis; being inversely formed, or in a pair, for this purpose. Preferably, as shown herein, the channel 14 is so related to these legs 16 and 17 that when the latter thus fit on the vehicle, the channels 14 diverge laterally outwardly at a small angle. Each leg 16 and 17 has a bolt hole through it horizontally.

The hole in the leg 16 is located to register with a hole in the front bolster 18 when one of the rivets of the bolster, uniformly found therein in the car of the construction illustrated, is removed, and when the bracket 13 is applied to the vehicle chassis front corner as was just described. The rear leg 17 has the hole so located that it will register with bolt holes left open by removing the bolt or rivet from the front foot 19 of the fender bracket 20 uniformly found on the vehicle illustrated, when the leg 16 is related to the bolster 18 as just described. Bolts 21 and 22 are passed through the registering openings, respectively, of the legs 16 and 17 and adjacent vehicle parts; thus firmly fixing the brackets 13 to the opposite corners of the chassis front, near the bottom of the vehicle radiator. This attachment of the brackets 13 may be made before the advanced bumper portion has its legs 4 bolted to the channels 14 of the brackets 13; which usually will be found more convenient than bolting the completely assembled bumper to the vehicle.

The rear bumper (Figs. 3 and 5) is attached by means of a pair of brackets 23 (Fig. 5) each comprising a chassis-engaging leg 24 and an extension 25 substantially at right angles to each other, as shown herein. Also, each leg or extension 24 and 25 is of cross-section composed of flanges at right angles to each other; the horizontal flanges extending outside of the leg angle at the upper edges of the vertical flanges of the respective legs, and being joined by an ample curve 26. The vertical flange of the extension 25 has two bolt holes horizontally through it; and it has near its rear end or junction with the vertical flange of the leg 24, a shoulder 27 presented away from that end or junction, or to the rear when bracket 23 is mounted on the rear end of the vehicle. The horizontal flange of the chassis-engaging leg 24 has a single bolt hole vertically through it.

The bolt holes in the extension 25 are located to register with the bolt holes in the end parts of the members 4 of the bumper advanced portion, with the free ends of these members abutting the shoulders 27 of the respective bracket extensions 25 and the upper edges of the members 4 lying close along the bottoms of the upper horizontal flanges of these extensions 25. Bolts 28 through these registering holes firmly fix the advanced part of the bumper to these attaching brackets 23. To attach these brackets 23 to the vehicle, the bolt 29 that attaches the body bracket 30 to the rear bolster 31 in the well-known motor car referred to and herein illustrated, is removed. This permits the horizontal upper flange of the chassis-engaging leg 24 of the bracket 23 to be slipped under the body-bracket 30 (Fig. 3) at the respective side of the vehicle, between this bracket 30 and the top of the rear bolster 29. The bolt hole in the leg flange is located properly to register with the holes in the bracket 30 and the bolster 31 where the bolt 29 was removed, while the vertical flange of this leg 24 abuts closely along the rear side of the bolster 31. Thus, the bolt 29 replaced through these holes, or, if it be not long enough, a similar slightly longer bolt passed through the registering holes, will firmly fix the bracket 23, and the bumper advanced part carried thereby, to the rear end of the vehicle chassis. As with the front bumper, the brackets 23 may be attached to the vehicle before they have the advanced part of the bumper attached to them, if this be found more convenient than attaching the completely assembled rear bumper to the vehicle.

The angular or L-shaped cross-section of the brackets 23, continuous through the curve 26, gives the brackets great strength; and the connected parts abutting the upper horizontal flanges of the brackets 23 and the shoulders 27 thereof, are thus held rigidly in alinement, greatly relieving the strains on the bolts that hold these parts together, and reducing the size and number of the bolts thus needed. Likewise with the abutment of the vertical flange of the leg 24 of each bracket on the rear side of the rear bolster 31, and the bearing of the horizontal upper flange of this leg between the top of the bolster 31 and the bottom of the body-bracket 30; permitting this attachment to be adequate with the use of the single bolt 29. The abutment of the members 4 with the flanges and shoulder 14' of the front brackets 13, and the ample bearing of the legs 16 and 17 on the front chassis corners, also serves the same purpose for the front bumper.

With such provisions as these, the shearing strength of the bolts is not relied upon; so that the bumper remains tightly fastened for a longer time and under heavier impacts than does a bumper attached merely to side surfaces of the chassis parts, by bolts or the like, or by other means, such as clips and the like, as in some prior bumpers. The brackets 13 of the front bumpers afford strong reinforcement of the front part of the chassis structure, as they attach across the corners thereof. Also, by making the bumpers attachable by the simple expedient of removing two of the bolts or rivets of the original vehicle structure at the front, and one bolt thereof at the rear, the installation of the bumpers on a vehicle of this construction is made very convenient. Bolts can thus be used without boring any holes in the original vehicle structure, avoiding the use of clips, which latter can hold only by friction unless very accurately fitted. Such accurate fitting, or boring of holes, is impracticable for a device to be installed by unskilled persons.

It will be understood that the sections 1 and 2 and the arch-bar 9 are made of suitable strong but resilient material, such as properly treated spring steel; and the brackets 13 and 23 are of rigid strong material, such as cast or forged steel or malleable cast iron.

The members 4 being resilient, they may be conformed to the rear brackets 23 extending parallel to each other as here shown, or to the front brackets extending divergently as here shown. The rear bolster 31 is somewhat longer than the front bolster 18 in the regular construction of the motor-car referred to and herein illustrated, and it is desirable to have the bumpers to join the vehicle near the ends of the bolsters at front and rear; but by the conformation just described the same bumper advanced part can be interchanged between front and rear of the vehicle. This makes only one kind of advanced part necessary; affording a convenience in manufacture, stocking and shipping of the bumpers. It is for this reason that the front brackets 13 are made to diverge, but the rear brackets 23 are made to extend parallel with each other.

However, both front and rear brackets may be made divergent, or both may be made parallel, with front and rear advanced parts to correspond, if desirable, or necessary under different conditions; as with different kinds of vehicles, other than the kind herein used as an example, and for which our invention is especially suitable, but to use with which our invention is not restricted. In any installation, on any vehicle construction, it will be understood that the attaching means should form a rigid support for the resilient advanced portion of the bumper, on the vehicle.

The described brackets 13 and 23, or brackets similar thereto in having the abutting flanges and shoulders, or in their reinforcement of the vehicle structure, rather than weakening thereof in their attachment thereto, are advantageous for attaching an advanced bumper structure of any kind. But we consider an important part of our invention to be the decided divergence and outward curvature of the side members 4, so that they are arched diagonally inward and forward toward each other and toward the front transverse means made up, as herein exemplified, by the lapping transverse members 3; together with the arch-bar 9 meeting the members or arches 4 with its ends and meeting the transverse means or lapping members 3 with its foremost middle part. Three cooperating arches are thus provided, by means of which an impact against any exposed part of the bumper is transmitted with great freedom to all of the other parts of the bumper by virtue of the flexibility of the material composing these arches. Thus, impact near the middle of the parts 3 is transmitted by the arch-bar 9 to both arches 4, and by them to both attachments at the opposite sides of the vehicle. An impact near one end or the other of the transverse means is transmitted partly directly through the adjacent arch 4 to the vehicle attachment, and partly through the arch-bar 9 to the opposite arch 4, thence to the opposite vehicle attachment.

By such a better distribution of strains, almost equally to all of the resilient members of the bumper, each member may be more rigid and self-sustaining, yet the aggregate resiliency of the bumper may be greater, than where the preponderance of strain transmission is along the lengths of substantially straight members as in some prior bumpers, or where the strains are transmitted through abruptly bent members, liable to breakage thereby, as in some prior bumpers. In our bumper, as disclosed, the only curves of moderate radius are in the parts 6 joining the arches 4 integrally to the members 3; and these are directly reinforced by the arch-bar 9 against any impact received by them in any direction.

The function of the bumper is to defend the vehicle parts from direct impact in collisions. If too yielding, it will permit direct impact with some vehicle part, and damage thereof, in collision. If too rigid, it will transmit too much of the shock to the vehicle; and if of a rigid nature depending merely upon weakness to yield for the cushioning effect, it will be broken. Our bumper derives its yielding properties not merely from the relative weakness of resilient members, but from the relation of the members to each other, in conjunction with the right degree of resiliency and proper proportions of the members. This bumper, constructed substantially as herein disclosed, is found in practice to combine the properties of aggregate resiliency and permanence of form to such a degree as to fully satisfy the requirements just stated, without undue complication of its construction and installation.

Modifications besides those alluded to herein are to be understood as being probable under varying conditions, as for instance in applying the invention to motor-vehicles of constructions or proportions other than those of the car taken as an example herein. Therefore, while certain constructional details are deemed preferable in connection with our invention, and we have shown and described these rather specifically in thus elucidating the construction and use of our invention, as is required, we do not wish to be understood as being limited to such precise showing and description, but having thus fully described our invention,

What we claim as new and desire to secure by Letters Patent is:

1. In a motor-vehicle bumper, a pair of flexible vehicle-connecting members diverging throughout their extent from their vehicle connections, flexible transverse means connected to said members near their diverged ends, a flexible arch with free separable end parts connected to respective ones of said members, near the middles of said members, and arching toward a middle part of said transverse means, and means to fix the other ends of said members to a vehicle, this means being the sole connection of the bumper to the vehicle.

2. In a motor-vehicle bumper, a pair of flexible vehicle-connecting members diverging throughout their extent from their vehicle connections, flexible transverse means connected to said members near their diverged ends, a flexible arch with free separable end parts fixed to respective ones of said members, near the middles of said members, and arching toward a middle part of said transverse means, and means to fix the other ends of said members to a vehicle, this means being the sole connection of the bumper to the vehicle.

3. In a motor-vehicle bumper, a pair of flexible vehicle-connecting members diverging throughout their extent from their vehicle connections, flexible transverse means connected to said members near their diverged ends, a flexible arch with free separable end parts connected to respective ones of said members, near the middles of said members, and curved throughout its extent between its connections to said members, and arching toward a middle part of said transverse means, and means to fix the other ends of said members to a vehicle.

4. In a motor-vehicle bumper, a pair of flexible vehicle-connecting arches curving divergently throughout their extent from their vehicle connections, flexible transverse means connected to said arches near their diverged ends, a third flexible arch with free separable end parts connected to respective arches of said pair, near the middles of said arches, and curved throughout its extent between its connections to said arches of said pair, and arching toward a middle part of said transverse means, and means to fix the other ends of said arches of said pair to a vehicle.

5. In a motor-vehicle bumper, a pair of flexible vehicle-connecting arches curving divergently from the vehicle, flexible transverse means connected to said arches near their diverged ends, a third flexible arch with end parts connected to respective arches of said pair, near the middles of said arches, and arching toward a middle part of said transverse means, and brackets having elements fixed to respective free end parts of said arches of said pair and having elements extending at an angle to each other to lie along angularly disposed parts of the vehicle, one of these elements of each bracket comprising means by which it is adapted to be fixed to the vehicle.

6. In a motor-vehicle bumper, a pair of flexible vehicle-connecting arches curving divergently from the vehicle, flexible transverse means connected to said arches near their divergent ends, a third flexible arch with end parts connected to respective arches of said pair, near the middles of said arches, and arching toward a middle part of said transverse means, brackets having elements fixed to respective free end parts of said arches of said pair and having elements extending at an angle to each other to lie along angularly disposed parts of the vehicle, and bolts, each extending through one of these elements of each bracket into one of said parts of the vehicle.

7. In a motor-vehicle bumper, a pair of flexible vehicle-connecting arches curving divergently from the vehicle, flexible transverse means connected to said arches near their diverged ends, a third flexible arch with end parts connected to respective arches of said pair, near the middles of said arches, and arching toward a middle part of said transverse means, and brackets having elements fixed to respective free end parts of said arches of said pair, with shoulders abutting the ends of these arches and flanges lying along the adjacent end parts of these arches, and having elements extending at an angle to each other to lie along angularly disposed parts of the vehicle, one of these elements of each bracket comprising means by which it is adapted to be fixed to the vehicle.

8. An attaching bracket for a motor-vehicle bumper, having an element to be fixed to an end part of the bumper and having elements extending at an angle to each other to lie along angularly disposed parts of a vehicle, one of said elements having an opening through which it is adapted to be fixed to the vehicle.

9. An attaching bracket for a motor-vehicle bumper, having an element to be fixed to an end part of the bumper with a shoulder to abut the end of the bumper, and having elements extending at an angle to each other to lie along angularly disposed parts of a vehicle, one of said elements comprising means by which it is adapted to be fixed to the vehicle.

10. An attaching bracket for a motor-vehicle bumper, having an element to be fixed to an end part of the bumper with a flange lying along the adjacent end part of the bumper, and having elements extending at an angle to each other to lie along angularly disposed parts of a vehicle, one of said elements having an opening through which it is adapted to be fixed to the vehicle.

11. An attaching bracket for a motor-vehicle bumper, having an element to be fixed to an end part of the bumper with a flange to lie along said end part and a shoulder to abut the end of the bumper, and having elements extending at an angle to each other to lie along angularly disposed parts of a vehicle, one of said elements comprising means by which it is adapted to be fixed to the vehicle.

12. An attaching bracket for a motor-vehicle bumper, having an element to be fixed to an end part of the bumper and having elements extending at an angle to each other to lie along angularly disposed parts of a vehicle, one of said elements having an opening registering with an opening regularly provided in the vehicle in the construction thereof, said openings receiving a bolt, whereby said bracket is fixed to the vehicle.

WILLIAM J. KOESTER.
JAMES D. FOSTER.